D. F. HUNT.
FRUIT PARER.
APPLICATION FILED SEPT. 19, 1904.
No. 900,018.
Patented Sept. 29, 1908.
3 SHEETS—SHEET 2.
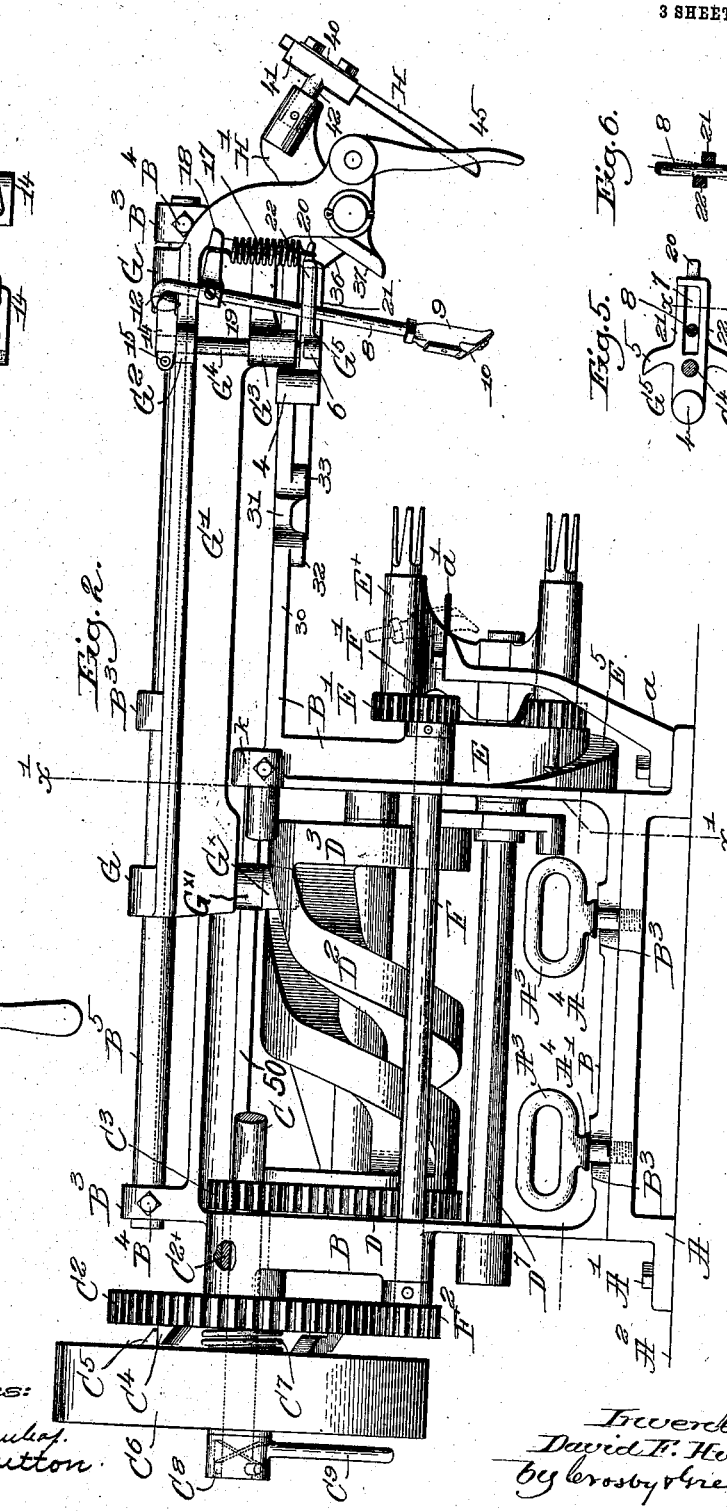

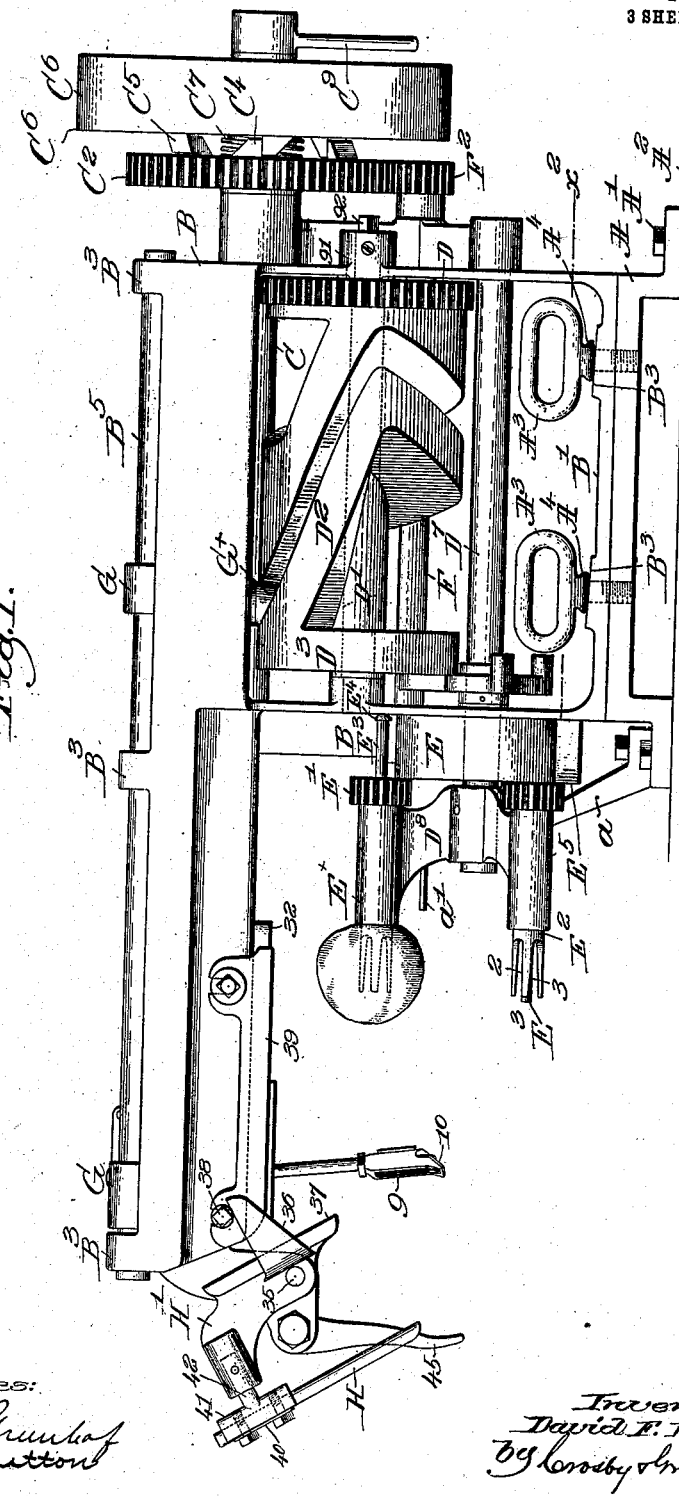

D. F. HUNT.
FRUIT PARER.
APPLICATION FILED SEPT. 19, 1904.
900,018.
Patented Sept. 29, 1908.
3 SHEETS—SHEET 3.
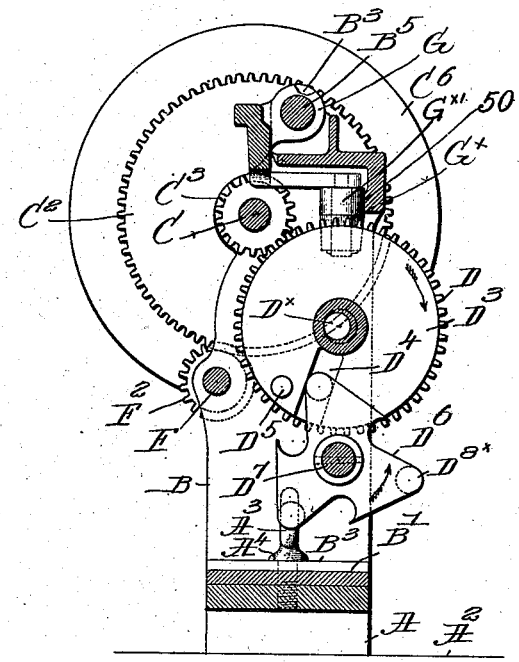

UNITED STATES PATENT OFFICE.

DAVID F. HUNT, OF ANTRIM, NEW HAMPSHIRE, ASSIGNOR TO HUNT MANUFACTURING COMPANY, A CORPORATION OF MASSACHUSETTS.

FRUIT-PARER.

No. 900,018.  Specification of Letters Patent.  Patented Sept. 29, 1908.

Application filed September 19, 1904. Serial No. 225,029.

*To all whom it may concern:*

Be it known that I, DAVID F. HUNT, a citizen of the United States, and a resident of Antrim, in the county of Hillsboro and State of New Hampshire, have invented an Improvement in Fruit-Parers, of which the following description, in connection with the accompanying drawings, is a specification, like letters on the drawings representing like parts.

This invention has for its object the production of a fruit parer in which the knife-carrier is so supported that it may move not only out-and-in in the slot in the turn-table, but may also rock in said turn-table in a direction transverse the length of said slot when, for instance, the knife-carrier meets the fruit which has been pared and which is about to be removed from the coring knife. I have also improved the construction of the fork and the core-discharging device. I have also provided means for automatically clearing the throat of the knife head. In machines of this class the acid of the fruit has to be removed from the machine after using the same. Ordinarily these machines are not removed from their benches and are imperfectly cleaned with a wet cloth or sponge consuming much time and labor. To provide for the cleaning of the machine I have divided the framework in two parts, namely, an upper portion containing the movable parts and a base, and by slacking a couple of clamp screws the top part may be drawn off from the base and immersed in any suitable cleansing liquid.

Figure 1 of the drawing in front elevation shows a paring machine embodying my invention, an apple having been pushed on the fork and the paring knife and corer being in their farthest positions from the apple. Fig. 2 is an opposite side elevation of the machine shown in Fig. 1; Fig. 3 is a detail showing the outer side of the starting lever; Fig. 4 is a top or plan view and an end view of the cam loop at the upper end of the turn-table upon which the hooked end of the knife-carrying bar is sustained; Fig. 5 is a plan view of the lower arm of the turn-table; Fig. 6 is a section thereof in the line $x$; Fig. 7 is a section in the line $x'$, Fig. 2; Fig. 8 is a section below the line $x^2$, Fig. 1; Fig. 9 is a detail, enlarged, of one of my novel forks, with the core-discharger in its inoperative position, the core discharger being broken out at one end to show its peculiar construction.

The base A of the fruit parer has suitable ears that receive bolts A' by which to confine the base firmly to the bench or table $A^2$. The base has two tapped holes that receive the threaded shanks of hand screws $A^3$ having, as shown, loop-shaped heads, the under sides of the bosses $A^4$ of each head being substantially parallel with the upper side of the base A.

The framework B of the fruit parer is shaped to receive and sustain the working parts to be described, and the lower end of the framework is terminated by a foot B' having open-ended slots $B^2$ to receive the clamping screws $A^3$. The upper side of the foot B' adjacent the slots $B^2$ is inclined transversely to the direction of the slots, as seen in Figs. 1 and 2, so that one side of each slot is higher than the other side. The result of this construction is that when the screws $A^3$ are tightened, the bosses $A^4$ thereof contact with and engage one side only of each slot. In Fig. 8, the high side of each slot is the left-hand side, and it will be observed upon referring to said figure that when the clamping screws are tightened, the friction between the bosses $A^4$ thereof and the left-hand side of the slot will tend to cause the foot of the framework to move further toward the top of the sheet, and thereby will tend to more firmly seat the clamping screws against the end of the slot.

In the embodiment of the invention herein shown the foot is provided with two slots $B^2$, and said slots are parallel and extend in the same direction and are situated unequal distances from the ends of the foot. This latter feature of the slots is plainly observable from Fig. 1 wherein the slot at the right of the foot is situated nearer the right hand end thereof than the other slot is to the left hand end. Since only two slots are employed it is possible to place the frame on the base either in the position shown in Fig. 1 or in a reverse position with the coring spoon pointing in the opposite direction from that shown in Fig. 1. When the frame is attached to the base, as shown in Fig. 1, the ends of the frame come flush with the ends of the base. If, however, the position of the frame should be reversed then the frame would overhang the base. When the frame does thus overhang the base a larger space is afforded for the parings than is afforded with the parts arranged as shown in Fig. 1. Under some circumstances it is desirable to thus increase the space for parings, and by making the slots $B^2$ at unequal distances from the ends of the foot of the frame the frame can be placed on the base in either one of its two positions.

It requires but a moment to insert a stick or tool in the slot of the heads of the clamp screws and turn them sufficiently to release the foot of the frame when the latter may be pulled off the base and set to soak in the usual liquid or material employed to remove the acid, which adds greatly to the life of the machine and avoids the deterioration thereof due to the acid of the fruit. This removability of the portion of the frame containing the working parts from the base is a matter of very great value to the user of a paring machine not only in the saving of time, but also in the saving of the machine.

The framework has suitable bearings that sustain the stationary shaft C held by setscrew $k$ that is embraced near its outer or right-hand end, see Fig. 2, by a hollow or sleeve-like hub $C^{2\times}$ that runs loose on said shaft, said hub having an attached tooth gear $C^2$ and a pinion $C^3$, the latter being located inside the framework as represented best in Fig. 2.

The gear $C^2$ has at its outer side a plurality of clutch teeth $C^4$, that may be engaged by clutch teeth $C^5$ extended from the inner side of a driving pulley $C^6$ which surrounds the shaft C loosely and may be operated in any usual way by power.

A spring $C^7$ is interposed between the inner side of the loose driving pulley $C^6$ and the outer side of the toothed gear $C^4$, said spring acting normally to move the driving gear longitudinally of the shaft to disengage its clutch teeth $C^4$ when the machine is to be stopped. To move the driving pulley longitudinally of the shaft I have provided the shaft C, near its outer end, with a pin $C^8$, shown best in Fig. 3, and have formed in the outer side of the starting lever $C^9$ applied loosely to said shaft, two concavities having cam-shaped bottoms and presenting shoulders so that by turning the handle $C^9$ thereon in the direction of the arrow, see Fig. 3, the inclines in the bottom of the chambers acting on the inner sides of the ends of the pin will cause the hub of the handle to travel longitudinally with relation to the shaft C and at the same time force the driving pulley longitudinally against the pressure of the spring referred to until the clutch-teeth of the driving pulley engage the clutch-teeth extended from the toothed gear $C^2$. The pinion $C^3$ engages a toothed gear D fixed to and forming one end of a drum $D^2$ having a spiral slot and sustained by a stationary shaft $D'$, shown by dotted lines Fig. 1, the opposite end of the drum having a fork-cam, shown as a metal plate $D^3$, having a radial slot $D^4$, see Fig. 7, and a pin $D^5$. The pin $D^5$ and the slot $D^4$ co-act in usual manner with a star-wheel $D^6$, which has pins $D^{8\times}$ and is secured to the shaft $D^7$ that in turn has fixed to it the fork-carrying reel $D^8$. As the drum $D^2$ is rotated the pin $D^5$ referred to strikes one of the straight faces of one of the arms of the star-wheel $D^6$ and turns the latter and its shaft $D^7$ and immediately thereafter the pin $D^{8\times}$ connected with the arm of the star-wheel, which was struck by said pin, enters the slot $D^4$, the fork-carrying reel thus having imparted to it an intermitting movement or step by step movement as the fruit is being pared.

The framework of the machine is provided with a ring E, the latter presenting a track located in substantially the vertical plane occupied by the inner end of the hub of the fork-carrying-reel, the face of said track constituting a bearing to contact with the inner or right hand sides, see Fig. 1, of the fork-gears $E'$ as the carrier is rotated to bring one fork after the other in position to receive fruit.

The forks $E^2$ used in the machine are of peculiar construction, viz., they are composed of tubes slotted at one end to form a series of prongs, preferably three, and it will be noticed in Fig. 9 that the edge 2 of each prong is in a substantially radial plane and extends substantially parallel to the longitudinal axis of the fork while the opposite edge 3 is somewhat inclined and is in a non-radial plane. The edge 2 is the leading edge of the fork, and by making said edge substantially parallel with the axis of rotation of the fork rather than inclined with relation to said axis as has heretofore been customary, the fruit being pared is better retained on the fork, for it will be obvious that the pressure of the knife against the exterior of the fruit being pared transmitted through the fruit to the prongs has a tendency, if the prong is inclined outwardly, as heretofore, to force the fruit from the prong. The rear end of the fork is threaded, as at 4, to receive the threaded hubs of the fork-gears $E'$. The tubular portion of the forks $E^2$ takes bearing in the tubular sleeves $E^\times$ of the fork-carrying reel, and I extend through the tubular shanks of the fork a core discharger $E^3$, the same being represented as a hollow tube provided at its inner end with a round headed stud or rivet $E^4$ forced tightly therein. The round head at the end of the core discharging fork in the rotation of the fork-carrying-reel travels over a cam $E^5$, see Fig. 2, surrounding the ring E, said core-discharger, when on the highest part of said cam, being forced longitudinally through the hollow shank of the fork to discharge the core left in the fork after removing the pared fruit. Applying the fruit to the fork pushes the core-discharger backwardly so that for a portion of the rotation of the fork-carrier the core-dischargers may be left in their inoperative position, the cam E⁵ acting to push the core-discharger outwardly to discharge the core only at the proper time with relation to the operation of the machine, all as usual.

The forks having been provided with fruit have to be rotated in the fork-carrying-reel during the paring operation, and that this may be done I have provided a shaft F having at one end a pinion F' that engages one after the other the gears E' surrounding the hollow shanks of the forks as said pinions in the intermitting rotation of the fork-carrying-reel are brought into position that the fruit, applied to a fork connected with said gear may be rotated for a sufficient time to insure the paring of the fruit.

The shaft F is rotated by the gear C² engaging a pinion F² fast on the outer end of shaft F.

The framework has suitable ears B³ in which is secured by suitable set-screws B⁴ a guiding-rod B⁵ which receives about it hollow ears G forming part of the carriage G' that has other ears G² and G³ that receive the rock-shaft G⁴ of the turn-table G⁵ to be described. The carriage G' has a roller-stud provided with two rollers G× and G×'. The roller G× enters the spiral slot in the drum D², and the roller G×' engages a track or guiding face 50 on the main frame, and said latter roller not only guides the frame in its movement, but constitutes an anti-friction device to lessen the friction between the parts, the rotation of the drum causing the knife-carriage to move back and forth on the rod B⁵ as will be obvious, the shape of the slot in said drum being such as to move the carriage outwardly at a very much faster speed than the carriage is moved inwardly during which time the knife, to be described, acts to pare the fruit held on the fork.

The turn-table G⁵, illustrated best in Fig. 5, has rising from its inner end a lug 4, and extended from its side near the shaft G⁴ two horns 5 and 6, and the long arm of the turn-table is slotted, as shown at 7, the slot receiving the knife-carrying-rod or bar 8 having connected with its lower end the usual knife-carrier or head 9 containing the usual knife 10 presenting the usual open throat through which the paring taken from the fruit is discharged at that side of the head opposite that to which the knife is secured.

The upper end of the rod or bar 8 is provided with a hook 12 that enters a slot 13 in a head cam lug 14 slotted at one end and connected by a clamp screw 15 with the upper end of the shaft G⁴. The narrow edge of the lug outside the slot 13 is made cam-shaped as represented at the right in Fig. 4 to form a shoulder 12 that will arrest the swinging movement of the upper end of the rod or bar permitting the hooked end to ride up the inclined surface 16 under the stress of the spring 17 connected at one end with an arm 18 adjustably secured to the bar or rod 8 by a set screw 19 and at its other end with a projection 20 extended from the end of the knife-carrier. The tendency of the spring 17 is always to hold the knife-head and knife yieldingly against the fruit being pared thus enabling the knife to adapt itself to variations in size of the fruit, the rod or bar at such time moving longitudinally in the slot 7.

Now it sometimes happens as the knife head and bar are being moved outwardly or to the right in Fig. 2 after paring the fruit, that the knife-head hits against the fruit yet on the coring blade H, especially if the fruit slips forwardly on the coring blade as the latter is being vibrated in receiving the fruit from the fork, and as a result the rod or bar 8 is bent which, of course, destroys the utility of the machine. To provide against this emergency I have located the two arms 21 and 22 of the turn-table, between which arms is the slot 7, so that the arm 21 is lower than the arm 22 viewing the same with relation to a horizontal plane, and as a result, if the knife-carrier meets the fruit, the carrier may move outwardly and rock over the lowermost arm 21 and at this time the hooked end of the bar 8 will be moved from the position Figs. 2 and 4, and made to travel up the incline 16 against the spring 17, and of course no damage is done to the rod or bar. This feature is a matter of very considerable importance and results in great saving in the use of a fruit paring machine.

That the turn-table may be rotated that the knife may follow about the fruit, the edge 30 of the framework B has a single notch 31, and said edge at the lower end of said notch has two projections, 32 and 33. As the carriage is moved longitudinally the projection 4 of the turn-table enters the notch 31, and the hook 6, supposing the turn-table to be moving from the position Fig. 2 to the left, will slide around and embrace the projection 32, and in the opposite movement of the carriage and turn-table, as when the knife is being put back into its normal or starting position, the projection 4 acts and the arm 5 slides around the projection 33.

In the use of a fruit parer it is frequently necessary to stop the machine and insert the thin blade of a knife in the throat of the paring head to clear the same that the paring may have free passage through the throat. I have provided means for doing this automatically, and I have secured to an upright a of the base, see Fig. 2, a clearer a', shown as a thin blade occupying just such a position with relation to the traveling movement of the knife and its head under the control of the turn-table and carriage, that when the knife completes the paring operation and is about to retire from the base end of the fruit the throat of the knife is passed automatically over the clearer, the clearer extending through the throat and thoroughly cleaning the same.

The coring blade H derives its movement from a tipping blade H' pivoted at 35 and having an upwardly projecting arm 36 and a shoulder 37, and the arm is tipped in usual manner by the stud 38 while the shoulder 37, by contact with the lower edge of the adjustable guide-way 39, guides the core-blade in a right line position to correctly enter the end of the fruit being pared to disengage the body of the fruit from the core which is entered by the fork. I have, however, improved the coring means by clamping the blade of the corer between two members 40 and 41, one being convexed to enter the concaved lower side of the corer-blade and the other being concaved to enter the top of the corer-blade. The portion 41 has an extended integral shank 42 that is entered in a hole made in the arm H' and is there retained by pouring Babbitt metal into a hole in the arm, the Babbitt metal surrounding the shank and holding the same in exactly the proper position in said arm. The wiper 45 to wipe the fruit from the corer-blade is of usual construction.

The shaft D' is shaped to present eccentrics D$^\times$ at its end, and the shaft is held in adjusted position by set screws 91, and by turning said shaft it is possible to provide for adjusting the spiral drum vertically toward or from the shaft D$^7$ to insure that the slotted plate D$^3$ at the end of said spiral drum shall always engage the star-wheel and turn the shaft D$^7$ properly. I have squared one end 92 of the shaft so that it may be readily engaged by a wrench to turn the shaft and move the spiral drum toward or from the shaft D$^7$.

Having fully described my invention, what I claim as new and desire to secure by Letters Patent is:

1. In a fruit parer, a base adapted to be permanently secured to a suitable support, a framework having a foot provided with two open ended slots situated at unequal distances from the ends of the foot, paring mechanism carried by said framework, and clamping screws screw-threaded to the base and entering said slots.

2. In a fruit parer, a base adapted to be permanently secured to a suitable support, a framework carrying paring mechanism, said framework having a foot provided with slots the upper surface of the foot being higher on one side of each slot than on the other, and a clamping screw extending through each slot and into the base, each screw having a shoulder to engage the high side of the corresponding slot.

3. In a fruit parer, a suitably supported skeleton drum having projecting ribs presenting between them an endless spiral slot extending once around the drum and from one end to the other thereof, a driving gear connected to and concentric with said drum, a knife-carriage having fixed thereto a projection which enters the slot in the drum, a paring knife on said carriage, a fork-carrying reel, a plurality of forks carried thereby, and means connected with the drum to intermitting move said reel.

4. In a fruit parer, a fork-carrying reel having a plurality of hollow sleeves, a fork rotatably mounted in each sleeve, each fork comprising a hollow shank presenting at one end tines and screw-threaded at the opposite end, a pinion screw-threaded to the latter end of each shank, each pinion engaging the corresponding sleeve, and a ring-shaped track against which the outer face of each pinion travels, said track preventing longitudinal movement of the fork.

5. In a fruit parer, a fork having at one end thereof tines, the front or leading edge of each tine being substantially parallel with the longitudinal axis of the fork and situated in a substantially radial plane, and the other edges being inclined to the front or leading edges.

6. In a fruit parer, a turn-table having a slotted arm, said arm being connected with an upright shaft having a slotted lug cam-shaped at its upper side, combined with a rod or bar having a hook to enter said slot and be sustained by the cam-shaped portion of said lug, said bar sustaining at its lower end a knife-carrier, a spring acting normally to keep the hooked end of the rod or bar in contact with said lug, the arms constituting the sides of the turn-table being of unequal height to enable the rod or bar to tip over the side wall of least height as the knife on its back stroke meets the fruit being pared, the hooked or upper end of the rod or bar at such time rising on the inclined surface of the lug.

7. In a fruit parer, a frame, a knife-carrier having a blade and a throat through which the paring is ejected, means to operate said knife carrier, and means carried by the frame to clear the throat of the knife carrier after each paring operation.

8. In a fruit paring machine, a core blade holder having a rigid projection extending from one side thereof, an arm having a socket to receive said projection, said socket being larger than the projection, and binding material as Babbitt metal filling the socket and holding the arm in the proper position therein.

9. In a fruit paring machine, a suitably supported spiral drum having at one end a toothed wheel and at its opposite end a fork cam, a carriage moved by said drum and provided with a turn-table and paring knife, a shaft provided with a fork carrying reel actuated by the fork cam, means to rotate said spiral drum, and a stationary shaft having eccentric journals to enable said spiral drum to be adjusted laterally with relation to the shaft upon which is mounted the fork carrying reel.

10. In a fruit parer, the combination with a stationary shaft having eccentric bearings by which it may be adjusted, a spiral drum surrounding said shaft and provided at one end with a toothed wheel, and a stationary shaft surrounded loosely by a hollow hub having at one end a toothed wheel and at its opposite end a toothed pinion and engaging with the toothed wheel of said spiral drum, of means to turn said hub, its pinion and gear to rotate the spiral drum when desired.

11. In a fruit parer, a drum having a single spiral slot of irregular pitch, a gear connected thereto, means engaging said gear to rotate said drum, a knife carriage having a stud entering the said spiral slot, the irregular pitch of said slot operating to give the carriage a variable speed.

12. In a fruit parer, a framework having a guiding face a drum having a single endless spiral slot extending once thereabout and from end to end thereof, means to rotate said drum, and a knife carriage having a stud entering said spiral slot and engaging said guiding face.

13. In a fruit parer, a framework having a guiding face, a drum provided with a single spiral slot, means to rotate said drum, a reciprocating knife carriage mounted on said framework, said knife-carriage having a stud entering said slot and two rolls on said stud, one being acted upon by the walls of said spiral slot and the other acting upon said guiding face, said rolls turning in opposite directions as the carriage is moving.

In testimony whereof, I have signed my name to this specification, in the presence of two subscribing witnesses.

DAVID F. HUNT.

Witnesses:
  A. A. BAKER,
  E. W. BAKER.

Correction in Letters Patent No. 900,018.

It is hereby certified that in Letters Patent No. 900,018, granted September 29, 1908, upon the application of David F. Hunt, of Antrim, New Hampshire, for an improvement in "Fruit-Parers," an error appears in the printed specification requiring correction, as follows: In lines 73–74, page 4, the word "intermitting" should read *intermittingly;* and that the said Letters Patent should be read with this correction therein that the same may conform to the record of the case in the Patent Office.

Signed and sealed this 27th day of October, A. D., 1908.

[SEAL.]

C. C. BILLINGS,
*Acting Commissioner of Patents.*